United States Patent Office 3,162,336
Patented Dec. 22, 1964

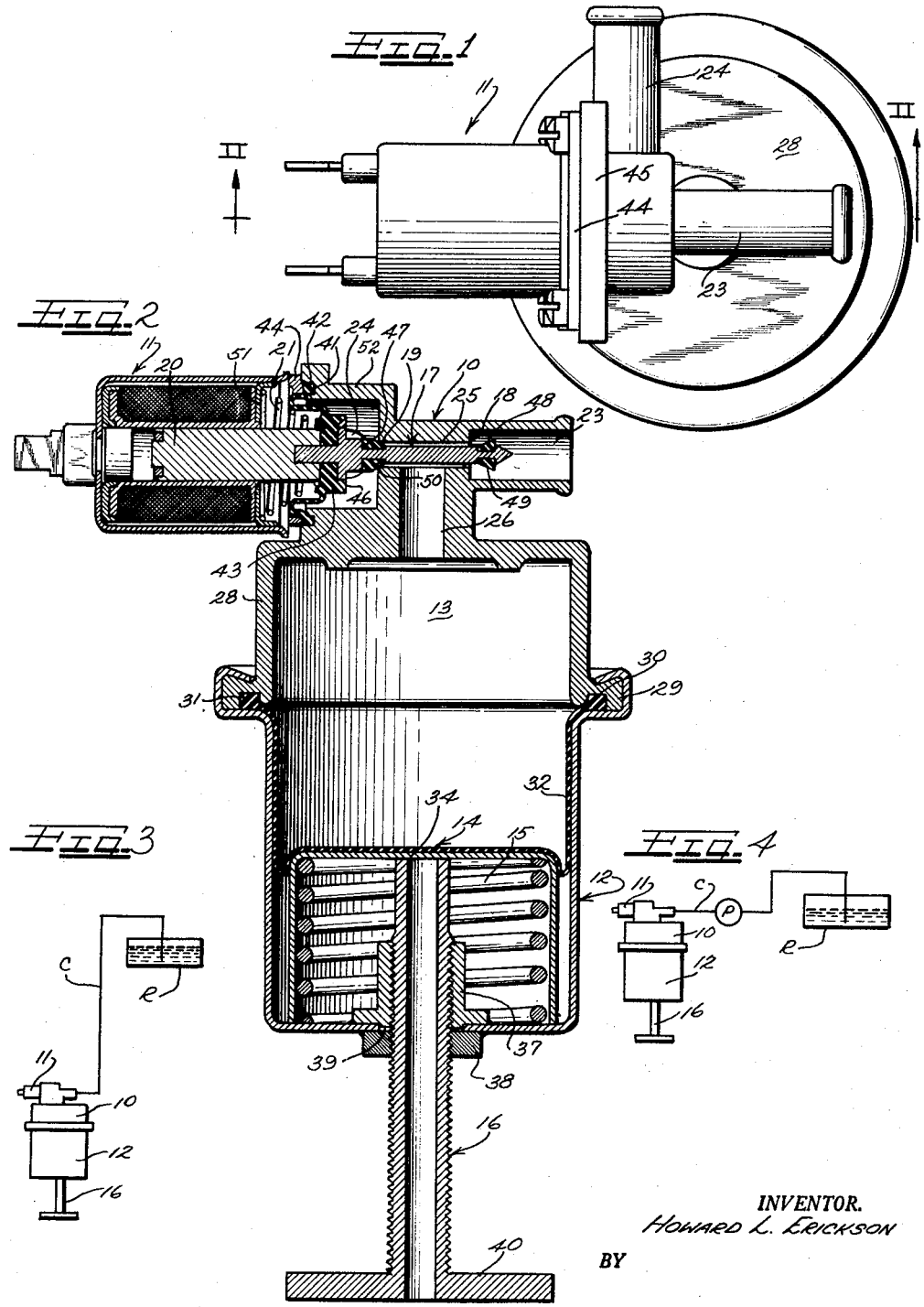

3,162,336
ADJUSTABLE SLUG LIQUID DISPENSER
Howard L. Erickson, Bensenville, Ill., assignor to The Dole Valve Company, Morton Grove, Ill., a corporation of Illinois
Filed Nov. 29, 1960, Ser. No. 72,448
1 Claim. (Cl. 222—309)

This invention relates to liquid dispensers and more particularly relates to a liquid dispenser which has highly efficient operating characteristics, and necessitates a considerably fewer number of operating parts than prior types of liquid dispensers and which may be expeditiously and economically manufactured.

Known types of liquid dispensers comprise in general a container for containing liquid to be dispensed, a measuring chamber which is communicable with the container, a port communicating liquid to be dispensed from the container to the measuring chamber, an outlet port opening from the measuring chamber to a point of utilization, check valves at the ports to control the flow of liquid therethrough, a movable wall in the measuring chamber to vary the volumetric capacity thereof, and in some instances means for limiting the movement of the movable wall to provide a means for adjusting the volumetric capacity of the measuring chamber.

Movement of the movable wall may be effected by a solenoid or pneumatic means; movement of the movable wall in one direction being effective to create a partial vacuum within the measuring chamber to withdraw liquid from the container through the inlet port and past its respective check valve into the measuring chamber and movement thereof in an opposite direction being effective to discharge liquid through the outlet port and past the outlet check valve. The dispenser which I have devised provides all of the advantageous operating characteristics of prior types of liquid dispensers but is quite simple in design, does not employ as many individual operating components as prior types of dispensers, and utilizes a solenoid or other operating means which need not have a very great force output and which may therefore be quite inexpensive.

The device which I have devised comprises generally a valve body having inlet and outlet ports which are communicable with a measuring chamber and which are aligned with one another. A double poppet valve member is cooperable with the ports to control the flow of liquid therethrough. The inlet port is communicable with a source of pressurized fluid and the outlet is connected to a point of utilization. A movable wall defines one wall of the measuring chamber and is biased in a direction to decrease the volumetric capacity thereof by a spring. The movable wall is moved in an opposite direction by the force of pressurized liquid entering the measuring chamber through the inlet port. Movement of the movable wall in this direction (to increase the volumetric capacity of the measuring chamber) is limited by an adjustable stop so that the maximum volumetric capacity of the measuring chamber can be determined by the operator.

A small solenoid is mounted on the valve body and has its armature operably connected to the valve member so that energization of the solenoid will move the valve member to close the inlet port and open the outlet port. Movement of the valve member in an opposite direction is effected by a compression spring.

It will be understood that the solenoid may be relatively weak and consequently rather small and inexpensive inasmuch as it is employed simply to effect axial movement of the valve member. In many prior types of dispensers a solenoid is employed to effect movement of the movable wall for drawing liquid into the measuring chamber or expelling liquid therefrom and in such circumstances the solenoid must be relatively large. Still further, my structure does not necessitate the provision of separate check valves but utilizes the single valve member in place thereof to control liquid flow through the ports.

It is therefore an object of the present invention to provide a simple, yet efficiently operating dispenser which may be expeditiously and economically manufactured.

A further and more specific object of the invention is to provide a dispenser which employs only a single valve member for controlling the flow of liquid through the unit.

Another and more specific object of the invention resides in the provision of a dispenser which can employ a solenoid having a lower power output than has heretofore been possible.

Yet another object of the invention is to provide a dispenser having a means for adjusting the volumetric capacity of the measuring chamber and employing only a single valve member for controlling liquid flow through the unit.

These and other objects of the invention will become apparent from time to time as the following specification proceeds and with reference to the accompanying drawings, wherein:

FIGURE 1 is a plan view of a dispenser constructed in accordance with the principles of the present invention;

FIGURE 2 is a vertical sectional view of the device illustrated in FIGURE 1 and taken along lines II—II of FIGURE 1;

FIGURE 3 is a diagrammatic view of one means for supplying pressurized liquid to the dispenser; and FIGURE 4 is a diagrammatic view of another means for supplying pressurized liquid to the dispenser.

The dispenser comprises in general a valve body 10 which has a solenoid 11 mounted thereon and which has a cap 12 affixed to a cup-shaped portion thereof to define a measuring chamber 13. A movable wall 14 defines one wall of the measuring chamber 13 and is biased in a direction to decrease the volumetric capacity of the chamber 13 by a compression spring 15. An adjustable stop 16 is screw threaded into the cap 12 and serves to limit the degree of movement of the movable wall in a direction to increase the volumetric capacity of the measuring chamber 13. A double poppet valve member 17 is cooperable with inlet and outlet ports 18 and 19, respectively, to control the flow of liquid therethrough. The valve member 17 is connected to the armature 20 of the solenoid 11 so that energization of the solenoid will move the valve member in a direction to close the port 18 and open the port 19. Movement of the valve member in an opposite direction is effected by means of a compression spring 21.

FIGURES 3 and 4 show alternative means by which pressurized liquid may be directed to the inlet port 18. In either event, if the valve member 17 is in the position illustrated in FIGURE 2, the force of pressurized liquid entering the measuring chamber will be sufficient to move the movable wall 14 against the biasing force of spring 15 to the position illustrated in FIGURE 2. Subsequent closure of the inlet port 18 and opening of the outlet port 19 by energization of the solenoid 11 will permit the spring 15 to urge the movable wall 14 in a direction to decrease the volumetric capacity of the measuring chamber 13 and thereby discharge the liquid contained therein through the outlet port 19. Of course, by screwing the stop 16 into the cap 12 the volumetric capacity of the measuring chamber 13 may be decreased to decrease the volume of liquid which will be discharged in the next cycle.

More specifically, the valve body 10 includes an inlet 23 and outlet 24 which are communicable with the inlet and outlet ports 18 and 19, respectively. A bore 25 extends between the ports 18 and 19 and opens to an enlarged bore 26 which is, in turn, communicable with the measuring chamber 13.

A cup-like portion 28 of the valve body 10 is formed integrally with the valve body and terminates in an outturned flange 29 having a groove 30 formed therearound. An enlarged bead 31 of a flexible diaphragm 32 is seated within the groove 30 and is maintained therein by an abutting portion of the cap 12, which extends around the flange 29, to secure the cap to the cup-like portion 28 in fluid tight relationship therewith. A combination stiffening plate and guide 34 is mounted within the cap 12 in juxtaposition to the diaphragm 32 and serves as a seat for one end of the compression spring 15 which, in turn, has its opposite end seated on the end wall of the cap 12. Threaded guide members 37 and 38 are mounted on the inner and outer surfaces, respectively, of the end wall of the cap 12 in registry with an aperture 39 formed therein and receive the threaded stop shaft 16.

The stop shaft 16 has a handle 40 formed on the outer end thereof to provide a means for rotating the shaft in the guide members and to move the shaft axially with respect to the cap 12. Thus rotation of the shaft 16 in one direction will move the shaft inwardly to move the movable wall 14 (comprising the diaphragm 32 and the member 34) in a direction to decrease the volumetric capacity of the measuring chamber 13.

The solenoid 11 is of the usual type having an armature 20 which is retracted toward the coil upon energization thereof. However, the solenoid may be quite small and have a relatively small power output as has been heretofore noted. A small cup 52 is formed integrally with the valve body 10 and has a groove 41 formed annularly around the lip thereof which serves as a seat for an enlarged annular bead 42 of a diaphragm 43. The solenoid 11 is seated against the periphery of the diaphragm 43 to maintain it in this seated position and is secured to the valve body by a yoke 44 which abuts a lip of the solenoid cover and which is screwed into a flange 45 formed integrally with and extending around the lip of the cup 52.

One end of the valve member 17 is secured to the armature 20 and extends through a central portion of the diaphragm 43. A disk 46 formed integrally with the valve member 17 abuts the inner surface of the diaphragm. The valve member 17 is shouldered as at 47 and 48 to provide seats for frusto-conically shaped valve members 49 and 50 which are cooperable with the inlet and outlet ports 18 and 19, respectively. Small shoulders are likewise formed adjacent the ends of the valve member to prevent the frusto-conically shaped valve members 49 and 50 from slipping along the valve member 17. The valve members 49 and 50 are resilient and provide a positive fluid tight seal when they are seated on the walls of the valve body 10 adjacent the ports 18 and 19.

The compression spring 21 rests against a central portion of the diaphragm 43 and has its opposite end seated on a transverse plate 51 associated with the solenoid 11 and serves to bias the valve member 17 in the direction illustrated in FIGURE 2.

FIGURE 3 illustrates an arrangement whereby a reservoir R is mounted above the dispenser and is communicable through a conduit C with the inlet 23. In this arrangement the hydrostatic head of liquid within the reservoir R provides sufficient liquid pressure to effect compression of the spring 15 when liquid enters the measuring chamber 13. In FIGURE 4 I have illustrated an alternative arrangement wherein a low pressure pump P serves to pump liquid from a reservoir R through a conduit C to the inlet 23 to provide the required pressurization of liquid.

From the foregoing it will be observed that I have provided a very simple dispenser which employs a minimum number of parts and yet which operates efficiently and can be cheaply produced.

It will be understood that this embodiment of the invention has been used for illustrative purposes only and that various modifications and variations in the present invention may be effected without departing from the spirit and scope of the novel concepts thereof.

I claim as my invention:

A dispenser comprising:
a dispenser body having a chamber formed therein and having aligned inlet and outlet ports communicable with said chamber,
means communicating said inlet port with a source of pressurized liquid,
a valve rod extending through said ports having valve members mounted thereon in spaced relation from one another and which are cooperable with said ports to control liquid flow therethrough,
a solenoid assembly mounted on said dispenser body and having an armature connected to said valve rod
whereby energization of said solenoid assembly will effect movement of said valve rod in a direction to close said inlet port and open said outlet port,
a spring means biasing said valve rod in an opposite direction to close said outlet port and open said inlet port,
a flexible bag disposed within said dispenser body with its periphery sealed to the wall thereof to define a wall of said chamber,
a backing plate disposed within said chamber on the opposite side of said bag from said ports and spaced from the wall of said chamber,
a spring engageable with said plate to bias same in the direction of said ports to discharge liquid contained within said chamber through said outlet port when said outlet port is open,
whereby said spring has a biasing force of sufficiently small magnitude to permit movement of said plate and bag in an opposite direction by the force of pressurized liquid flowing into said chamber from said inlet port, and
a threaded adjustment member threadedly mounted within said dispenser body on the same side of said bag as said backing plate and having an end engageable with said plate
whereby axial threaded adjustment of said adjustment member will determine the limit of liquid-pressure-caused movement of said plate and bag.

References Cited by the Examiner

UNITED STATES PATENTS

| | | | |
|---|---|---|---|
| 1,764,823 | 6/30 | Bowlus | 222—335 |
| 2,458,230 | 1/49 | Warcup | 222—504 |
| 2,526,735 | 10/50 | Buce | 222—504 XR |
| 2,585,172 | 2/52 | Reynolds | 222—129.3 XR |
| 2,675,946 | 4/54 | Strempel | 222—333 XR |
| 2,804,241 | 8/57 | McDowall et al. | 222—335 |
| 2,814,422 | 11/57 | Mercier | 222—309 XR |
| 2,959,341 | 11/60 | Noakes | 222—453 XR |
| 3,048,171 | 8/62 | Grau | 222—386.5 XR |

RAPHAEL M. LUPO, *Primary Examiner.*

LOUIS J. DEMBO, LAVERNE D. GEIGER,
*Examiners.*